March 8, 1932.  H. W. BELL  1,848,096
STEERING MECHANISM FOR MOTOR VEHICLES
Original Filed Oct. 23, 1922
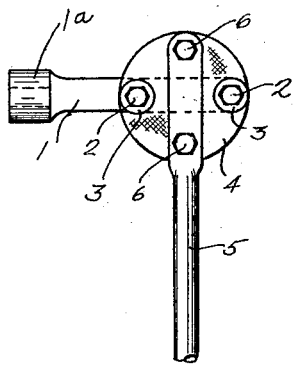
Fig.1
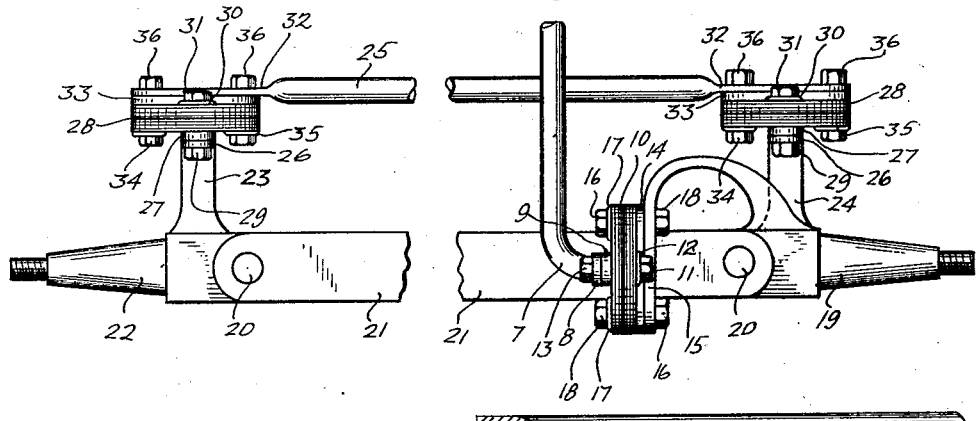
Fig.2
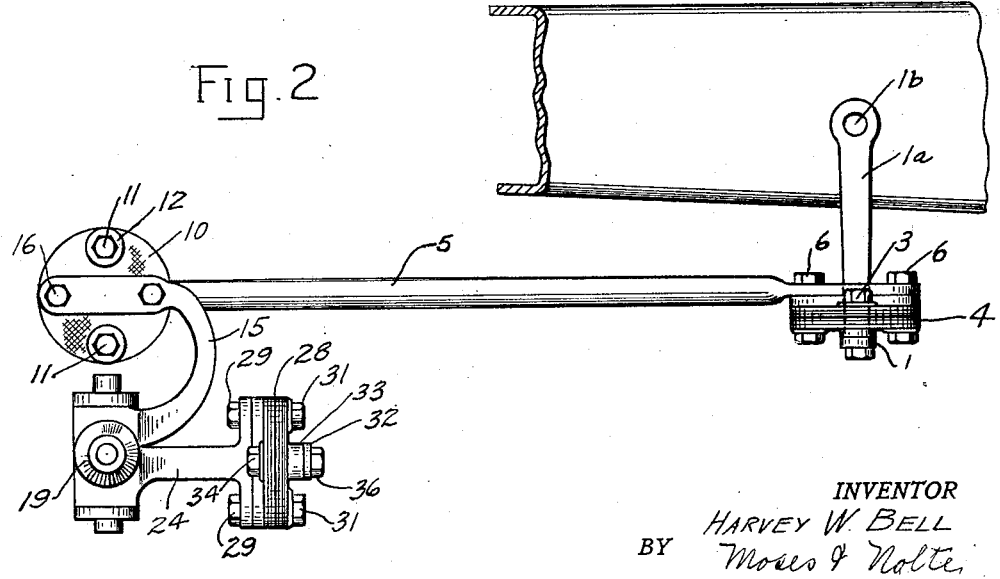
INVENTOR
HARVEY W. BELL
BY Moses & Nolte
ATTORNEY Patented Mar. 8, 1932

1,848,096

UNITED STATES PATENT OFFICE

HARVEY W. BELL, OF ARDSLEY ON HUDSON, NEW YORK, ASSIGNOR TO THE BELOYT CORPORATION, OF NEW YORK, N. Y., A CORPORATION OF DELAWARE

STEERING MECHANISM FOR MOTOR VEHICLES

Original application filed October 23, 1922, Serial No. 596,250, and in Great Britain June 4, 1925. Divided and this application filed August 24, 1926. Serial No. 131,143.

This invention relates to steering mechanism in motor vehicles and has for its principal object to reduce the number of metallic, pivotal connections in such mechanism whereby the number of points requiring lubrication is reduced, frictional wear is eliminated, and the mechanism is caused to operate more quietly than heretofore.

The present invention is a division of my pending application, Serial No. 596,250 for flexible connections for motor vehicles, filed October 23, 1922.

Other objects and advantages will hereinafter appear.

In the drawings forming a part of this specification:

Figure 1 is a plan view, partly broken away, showing the connection from the steering column to the front wheels of a motor vehicle; and Figure 2 is a side, sectional elevation showing such connection.

The drawings illustrate the use of flexible, non-metallic connections between the various parts of the steering mechanism of a vehicle. The steering column (not shown) is connected to rotate a rock arm 1ª about a transversely extending, horizontal pintle 1ᵇ as an axis to move an arm 1 at the outer end of the rock arm 1ª forward and backward. The arm 1 is clamped by means of suitable bolts 2, washers 3 and nuts (not shown) to a horizontally disposed, flexible, non-metallic, inelastic plate or disc 4, such plate being preferably formed of rubberized fabric. The arm 1 is narrow and extends along a diameter of the disc 4, being clamped to the disc at opposite ends of such diameter. A substantially horizontal rod 5 is disposed at the opposite side of the disc from the arm 1, to extend along a diameter of the disc substantially at right angles to the arm 1. This rod is also narrow and is clamped to the disc at diametrically opposite points by any suitable means, as by bolts 6.

At its forward end the rod 5 has an elbow 7, the outer end of which is provided with a vertical plate 8, preferably integral with the rod. A bearing and clamping plate 9 extends vertically, in contact with the plate 8, and together with the plate 8 is clamped to a vertically disposed plate or disc 10 by means of bolts 11, washers 12 and nuts 13, the connections to the plate being made at diametrically opposite points. A longitudinally extending clamping and bearing plate 14 is disposed at the opposite side of the flexible disc from the clamping plate 9 and lies in contact with a steering knuckle arm 15. The steering knuckle arm 15 and clamping plate 14 are secured at diametrically opposite points to the flexible disc 10 by means of bolts 16, washers 17 and nuts 18. The steering knuckle arm 15 is integral with the wheel spindle 19 of the left front wheel of the vehicle, so that through the described connections the turning of the arm 1 is effective to rotate the spindle 19 about a king bolt 20 that pivotally connects the spindle to the front axle 21 of the vehicle. In such operation the necessary pivotal movements between the arm 1 and rod 5 and between the rod 5 and steering knuckle arm 15 are provided by the flexibility of the fabric discs.

In order to cause the right front wheel to turn substantially in unison with the left one, the right wheel spindle 22 and the left wheel spindle 19 are provided with rearwardly extending arms 23 and 24 respectively which are connected for substantially parallel movement by a rod 25.

Between each of the arms 23 and 24 and the rod 25 there is provided a flexible connection similar to the connections heretofore described. That is, the arm 24 has a vertically extending web 26 engaged by a clamping plate 27 and connected to vertically disposed, flexible discs 28 by bolts 29, washers 30 and nuts 31, the points of connection being located at opposite ends of the vertical diameter of the disc. The rod 25 terminates in a horizontally extending, flattened portion 32 which, together with a clamping plate 33, is connected at diametrically opposite points to the flexible discs 28 by means of bolts 34, washers 35 and nuts 36. The connection between the arm 23 and the rod 25 being exactly like that of the arm 24 and the rod 25, need not be described in detail. Upon rotation of the left wheel spindle about the king bolt 20 the arm 24 is caused to rotate and to move the rod 25 longitudinally. Since the rod 25 is maintained substantially parallel to the front axle 21, such movement necessarily involves a change in the angular relation of the arm 24 and the rod 25. The flexible connection described provides for such movement by the flexing of the discs 28. Similarly the connection between the arm 23 and the rod 25 provides for relative angular movement of these elements.

The described construction involves no relatively movable metallic parts, and hence requires no lubrication and cannot squeak or rattle in use. The parts are of such character that no lubrication whatever is required, and as these connections are located in somewhat inaccessible positions underneath the vehicle body, the avoidance of lubrication is a point of considerable advantage.

It will be observed that the flexible discs 4 are arranged horizontally and that the flexible discs 10 are arranged vertically. This is a point of considerable importance for the reason that the steering column is mounted upon a sprung part of the vehicle, whereas the wheel spindle 19 is an unsprung part. There must, therefore, be provision for considerable relative movement between the steering column and the spindle 19 as the vehicle travels. Much of this relative movement occurs in a vertical direction and is taken care of in the steering connection by flexing of the horizontally disposed plates 4, and a corresponding slight angular yield in the vertically disposed plates 10. It will be seen, therefore, that the described connections are not rigid, but that they are well adapted to form a flexible operating connection between the sprung and unsprung parts.

The association of the horizontally disposed plates 4 with the arm 1, and the association of the vertically disposed plates 10 with the steering knuckle arm 15 is also important. The operation of the steering wheel swings the arm 1 about the axis of the pintle 1ᵇ as a center, changing the angular relationship, in a vertical plane, of the arm 1ᵃ and rod 5. The horizontally disposed plates 4 are capable of flexing to take care of this relative movement, without permitting lost motion. Similarly the longitudinal movement of the rod 5 swings the arm 15 about the axis of the king bolt 20 as a center, changing the angular relationship, in a horizontal plane, of the rod 5 and arm 15. The vertically disposed plates 10 are readily capable of flexing to take care of this relative movement.

Variations may be resorted to within the scope of the invention, and parts of the improvements may be used without others.

What I claim is:

1. In a motor vehicle, in combination, a steering column arm mounted on a sprung part of the vehicle, a wheel spindle constituting an unsprung part, and flexible means interposed between the steering column arm and the wheel spindle for turning the latter from the former, comprising a horizontally disposed, flexible plate arranged to flex about a horizontal axis when the sprung and unsprung parts move vertically with relation to one another, a vertically disposed, flexible plate arranged to flex about a vertical axis when the sprung and unsprung parts move laterally with relation to one another, and a long, rigid thrust rod rigidly connected at opposite ends thereof to the plates.

2. In a motor vehicle, in combination, a steering column arm mounted on a sprung part of the vehicle, a wheel spindle constituting an unsprung part, and flexible means interposed between the steering column arm and the wheel spindle for turning the latter from the former, comprising a horizontally disposed, flexible plate arranged to flex about a horizontal axis when the sprung and unsprung parts move vertically with relation to one another, and a vertically disposed, flexible plate arranged to flex about a vertical axis when the sprung and unsprung parts move laterally with relation to one another, said horizontal and vertical plates being both arranged to flex also about horizontal axes extending longitudinally of the vehicle.

3. In a steering mechanism for motor vehicles, in combination, a manually controlled operating member constituting a sprung part, an operated member constituting an unsprung part, and operating connections between said members comprising a connecting rod, and flexible plates at opposite ends of the rod connecting it to said operating and operated members respectively, said plates being disposed substantially at right angles to one another.

4. In a motor vehicle steering gear, in combination, an operating arm pivoted on the vehicle body for fore and aft swinging movement about a horizontal axis, and constituting a sprung part, a thrust rod extending forwardly therefrom, a steering knuckle constituting an unsprung part pivoted on the front axle for swinging movement about a vertical axis and having an arm whose end swings in a fore and aft direction, a horizontally disposed flexible plate fixedly secured upon one axis to the arm on the vehicle body and upon a transverse axis to the thrust rod, and a longitudinally extending, vertically disposed, flexible plate interposed between the thrust rod and the steering knuckle arm and fixedly secured to one of them upon a horizontal axis and to the other upon a vertical axis.

5. In a steering mechanism for a motor vehicle including a wheel axle and a steering member, operating connections between the steering member and the axle including a rod and a member of flexible material connected to the axle and the rod at quadrangularly related points, the points of connection to the rod being located at opposite ends of one diagonal and the points of connection to the axle being located at opposite ends of the other diagonal.

6. In a steering mechanism for a motor vehicle including a wheel axle and a steering member, operating connections between the steering member and the axle including a rod and a member of flexible material rigidly connected to the axle and to the rod at quadrangularly related points, the points of connection to the rod being located at opposite ends of one diagonal and the points of connection to the axle being located at opposite ends of the other diagonal.

In testimony whereof, I have affixed my signature to this specification.

HARVEY W. BELL.